United States Patent [19]

Wada et al.

[11] 4,152,730

[45] May 1, 1979

[54] SYNCHRONIZATION SYSTEM IN A FACSIMILE SYSTEM

[75] Inventors: Tasaku Wada, Tokyo; Yukio Nakagome, Yokohama, both of Japan

[73] Assignee: Kokusai Denshin Denwa Co., Ltd., Tokyo, Japan

[21] Appl. No.: 794,316

[22] Filed: May 5, 1977

[30] Foreign Application Priority Data

May 15, 1976 [JP] Japan .................................. 51-54813

[51] Int. Cl.² ............................................... H04N 1/14
[52] U.S. Cl. ..................................... 358/268; 358/286
[58] Field of Search ............... 358/268, 293, 286, 296, 358/264, 265

[56] References Cited

U.S. PATENT DOCUMENTS 3,832,484 8/1974 Tanaka .................................. 358/296
3,886,371 5/1975 Lloyd .................................... 358/285

Primary Examiner—Robert L. Griffin
Assistant Examiner—Edward L. Coles
Attorney, Agent, or Firm—Armstrong, Nikaido, Marmelstein & Kubovcik

[57] ABSTRACT

In a facsimile system having a carrier movable linearly in both directions with a read-head and a write head for scanning an original paper and/or a printing paper, the movement of the carrier of the facsimile system in a receiving mode is initiated by the synchronization signal sent from another facsimile system in a transmission mode, thus the operation of the facsimile system in the receiving mode is synchronized with that in the transmission mode, on a start-stop basis. Said synchronization signal is sent from the transmission station to the receiving station for every both way trip of the carrier.

2 Claims, 4 Drawing Figures

SYNCHRONIZATION SYSTEM IN A FACSIMILE SYSTEM

BACKGROUND OF THE INVENTION

The present invention relates to a synchronization system for a facsimile system.

In a reciprocating plane-scanning type facsimile device, in particular, a device for both receiving and sending, main scanning is carried out by reciprocating linear motion of a carrier which carries a read-head and a write head. The U.S. patent application Ser. No. 770,784, now U.S. Pat. No. 4,075,664 is an example of that device. According to said prior art, the movement of the carrier in the receiving station is initiated by a synchronization signal sent from the transmission station, thus the operation of the receiving station is synchronized with the operation of the transmission station. Said synchronization signal is, in said prior art, sent from the transmission station to the receiving station for every one way trip of the carrier. That is to say, the synchronization signal is sent out just when the carrier starts from the left extreme end to the right, and the synchronization signal is sent out again just when the carrier starts from the right extreme end to the left. Thus, a pair of synchronization signals are sent out for every both way trip of the carrier from the transmission station to the receiving station.

However, in said prior synchronization system, there is the disadvantage that the carrier in the receiving station can be initiated at the right extreme end by the synchronization signal from the transmission station when the carrier stays at the left extreme end, and the carrier in the receiving station is initiated to the left extreme end by the right synchronization signal. This kind of synchronization error occurs in particular when the receiving station does not receive some of the synchronization signal due to noise and/or intermittent breakdown in a communication circuit. If such synchronization error occurs, the pattern reproduced in the receiving station is the inversed image of the original pattern in the transmission station.

SUMMARY OF THE INVENTION

It is an object, therefore, of the present invention to overcome the disadvantages and limitations of the prior facsimile scanning system by providing a new and improved synchronization system for a facsimile system.

The above and other objects are attained by a facsimile scanning system having a carrier movable linearly in both directions, a read-head and a write head mounted on said carrier for scanning an original paper and/or a printing paper, the movement of the carrier in the receiving station being initiated by the synchronization signal sent from the transmission station for every both way trip of the carrier on a start-stop basis.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENT

Figure 1:
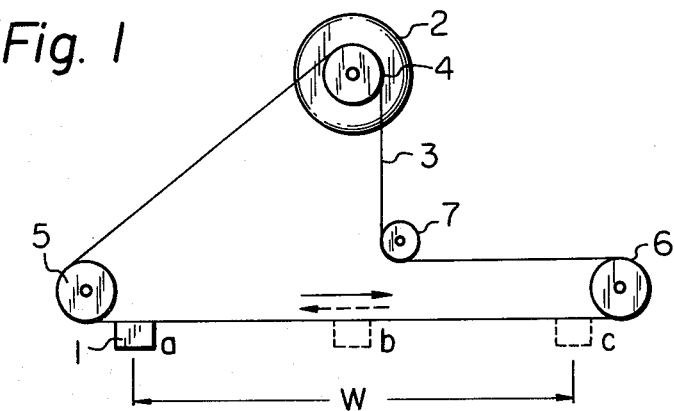
FIG. 1 shows the mechanism for driving the main scanner according to the present invention.

FIG. 1 shows the mechanism for driving the main scanner in a facsimile device according to the present invention. A read-head and a write head are fixed to a carrier 1, which is fitted to a belt 3. The belt 3 is held taut by pulleys 4 to 7, the pulley 4 being tightly fixed to the shaft of a pulse motor 2 for main scanning. Alternate forward and backward rotations of the pulse motor 2 cause the carrier 1 to travel from positions a through b to c and then return from the positions c through b back to a. The distance W from the position a to c relates to the width of an original paper or printing paper. Reciprocating motion of the carrier 1 thus causes the read-head and write head to perform main plane-scanning across the surface of the original paper and the printing paper.

Figure 2:
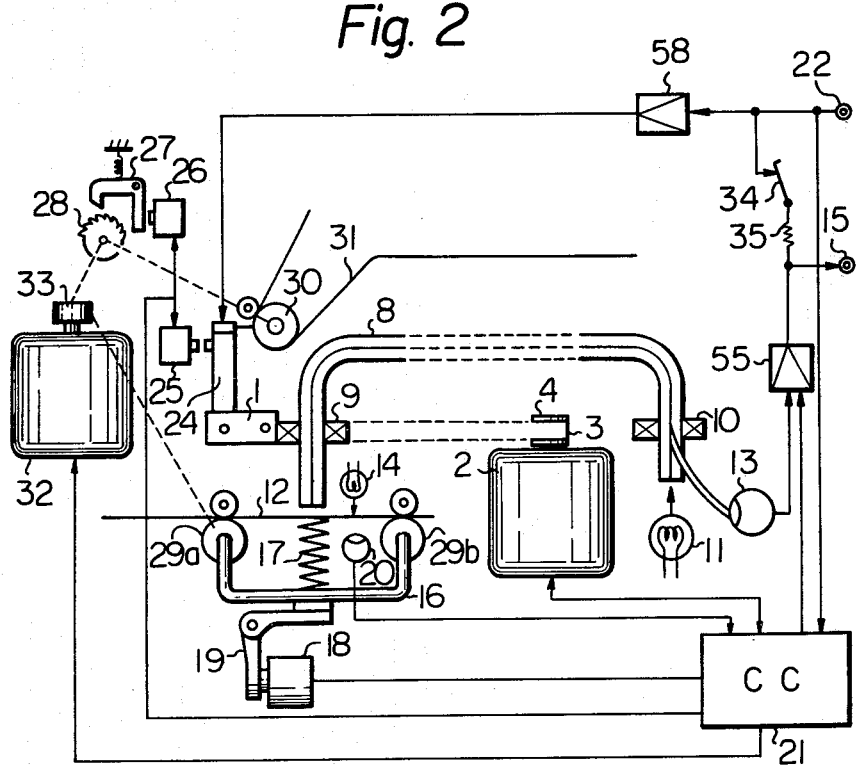
FIG. 2 is a schematic diagram showing the mechanical composition of the facsimile system according to the present invention.

FIG. 2 is a schematic diagram wherein the mechanical composition of an example according to the present invention is shown briefly. Supported by bearing 9 fixed to the carrier 1, an end of an optical fiber assembly 8 consitutes a readhead facing an original manuscript 12, whereas the other end, supported by another bearing 10, is placed facing a light cource 11 and photodetector 13. A write head 24 is placed facing a recording paper 31. The main pulse motor 2 drives the carrier 1 via the belt 3. Auxiliary scanning, that is, the delivery of the manuscript or printing paper, is performed by another pulse motor 32 which has a shaft to which a pulley 35 is tightly fixed, the pulley 35 being connected to a manuscript-delivering roller 29a, a ratchet gear 28 and a printing paper-delivering roller 30. Electromagnets 25 and 26 prevent recording action: When the electromagnet 26 is activated, a latch lever 27 is attracted and the ratched gear 28 is locked so that power from the pulse motor 32 is not transmitted to the roller 30. When the electromagnet 25 is activated, on the other hand, a recording head 24 is attracted so that the printing electrode for electric discharge printing is separated from the printing paper. In case no signal is received, said electromagnets 25 and 26 are activated to prevent recording and auxiliary scanning, that is, delivery of printing paper, whereas in case a signal is received, printing becomes possible as these electromagnets are not activated. Another electromagnet 18 is for initiating the read operation: When the original paper 12 is inserted, light from the source 14 is shielded by said original paper and cannot reach a sensor 20, thus the electromagnet 18 is activated by a control circuit 21 so that lever 19 and original paper delivering mechanism 16 overcome a compression spring 17 and are raised. As a result, the original paper 12 is compressed between the original paper delivering rollers 29a, 29b and the corresponding auxiliary rollers, arranged opposite to the former, so that the read and original paper delivery (auxiliary scanning) operations become possible. In case signals are being transmitted, said electromagnet 18 is activated so that read and auxiliary scanning are possible, whereas in case no signals are being transmitted the read operation is prevented because said electromagnet 18 is not activated. The activation of all these electromagnets 25, 26 and 18 is controlled by the control circuit 21.

Figure 3:
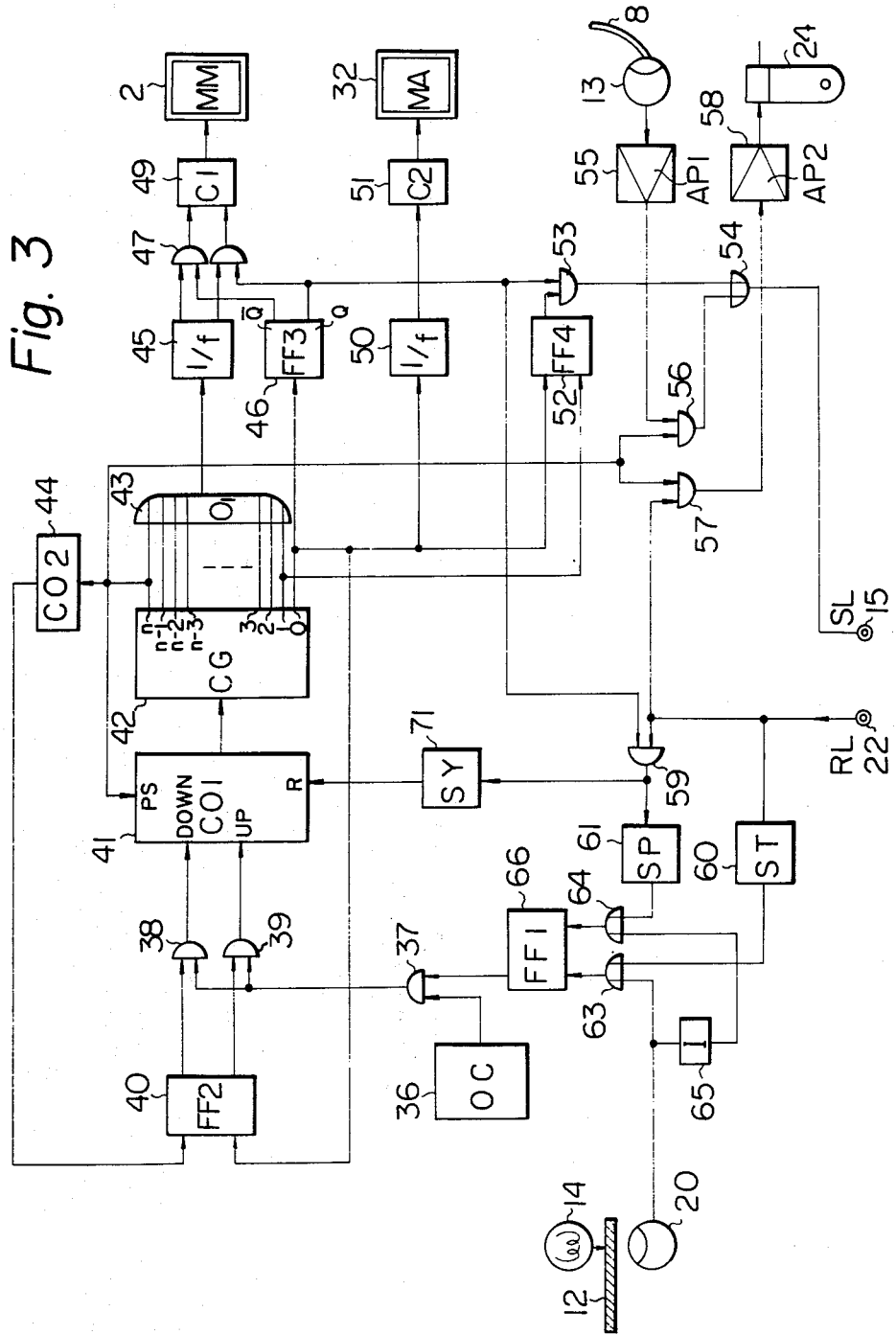
FIG. 3 is the circuit diagram of the control circuit of the facsimile system according to the present invention.

FIG. 3 shows a block diagram, wherein the components of the control circuit according to the present invention are basically represented; and in the following, the functions of the example will be described in detail.

Insertion of an original paper 12 starts the transmission operation. Once an original paper 12 is inserted, light from the source 14 is cut off and thus the sensor 20 acts to invert a flip-flop 66 through an OR-gate 63, the inverted output of this flip-flop 66 causes an AND-gate 37 to open and the pulse signals from an oscillator 36 are applied to AND-gates 38 and 39. Another flip-flop 40 causes the AND-gate 39 open, so that said pulse signals are sent to the "UP" terminal of the first counter 41. This counter 41 is controlled so that clock pulse (0), (1), (2), . . . to (n) are consecutively received from each terminal of clock pulse generator 42, and these clock pulses are applied to the main pulse motor for main scanning through an OR-gate 43, a frequency divider 45, and AND-gate 48 and a driving circuit 49 to start and accelerate the pulse motor 2. When the clock pulse generator 42 reaches (n) a pre-set signal is applied to the first counter 41 and thereafter (n) clock pulse in successively received from the clock pulse generator 42 so that the pulse motor continues rotating at a constant-speed. At the same time, the second counter 44 starts operating to count the number of clock pulses (n). This counter 44 counts up to the number of pulses which corresponds to the distance travelled by the carrier during one scanning operation over the width of the printing paper or the original paper. When the clock pulses (n) reach a predetermined number, the output of the counter 44 causes the flip-flop 40 to invert so that the pulse signals from the occillator 36 are sent to the "DOWN" terminal of the counter 41 through the AND-gate 38. As a result, the clock pulse generator 42 successively generates clock pulses (n), (n−1), (n−2) . . . , (2) and (1), causing the pulse motor 2 to decelerate. When the clock pulse (0) is finally received from the clock pulse generator 42, the flip-flop 40 is inverted then the AND-gate 39 opens and the counter 41 begins the upcounting action again. At the same time, a flip-flop 46 is also inverted so that AND-gates 48 and 47 close and open, respectively, causing the pulse motor 2 for main scanning to rotate in the backward direction. When the end of the original paper 12 is detected by the sensor 20 and then the flip-flop 66 is inverted through an inverter 65 and an OR-gate 64, the transmission operation is completed.

Figure 4:
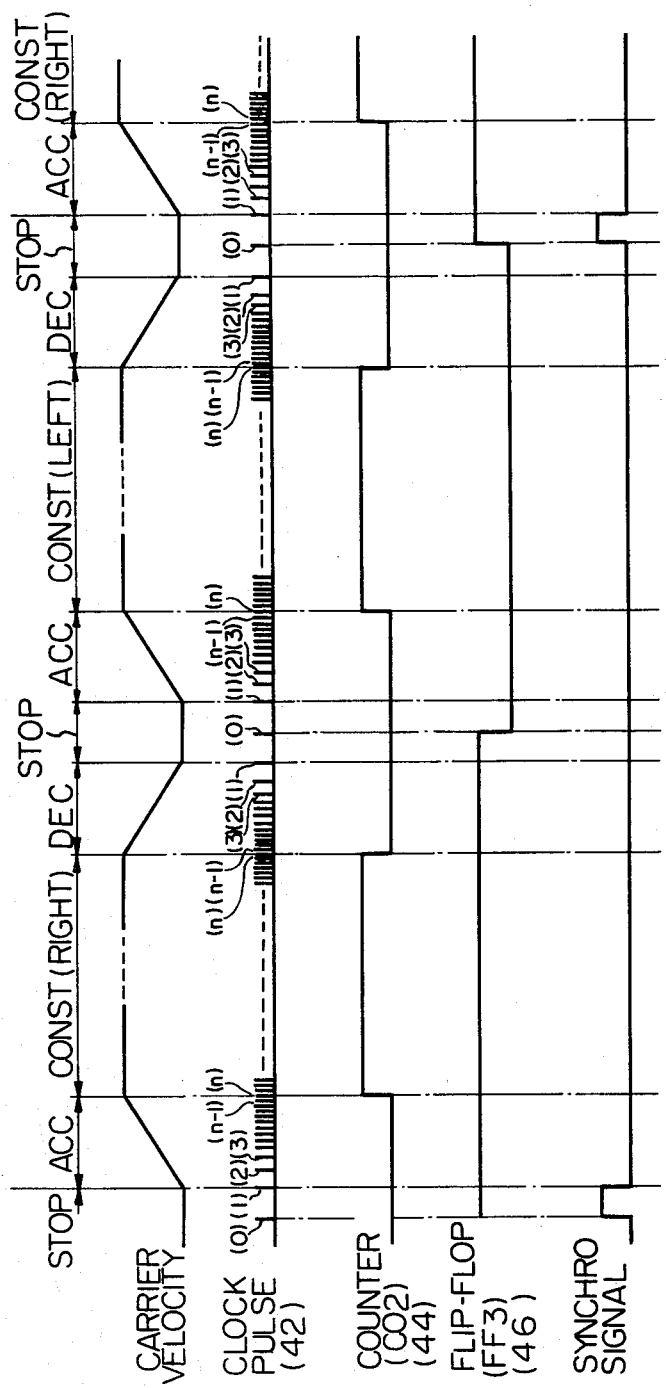
FIG. 4 is a time chart showing the operation of the facsimile system according to the present invention.

When the clock pulse from the clock pulse generator 42 changes from (0) to (1), a synchronization signal is sent from flip-flop 52 through an AND-gate 53, an OR-gate 54 and an output terminal 15. Since the AND-gate 53 becomes open only when output terminal Q of the flip-flop 46 takes the condition "1", however, the synchronization signal is sent out only at this time. The condition of the flip-flop 46 changes every time the clock pulse (0) is generated from the clock pulse generator 42. Therefore, said condition of the flip-flop 46 indicates the direction of the movement of the carrier 1, as shown in FIG. 4. That is to say, the output Q of said flip-flop 46 is ON when the carrier 1 is moving from (a) to (c), while the output Q of the flip-flop 46 is OFF when the carrier 1 is moving from (c) to (a). Since the synchronization signal from the flip-flop (FF4) 52 is applied to the AND-circuit 53, which receives the output Q of the flip-flop 46, the synchronization signal is sent out from the output terminal 15 for every both way trip of the carrier 1. Since an AND-gate 56 becomes open when the clock pulse from the clock pulse generator 42 is (n) (during the constant-speed operation of the pulse motor 2), the picture signal is transmitted only during said period through the optical fiber assembly 8, the photodetector 13, an amplifier 55, said AND-gate 56, the OR-gate 54 and an output terminal 15. When the clock pulse is (0) (when the carrier stops momentarily at either the left or right end of the movement, that is, at the end of each one main scanning), the pulse motor for auxiliary scanning is driven through a frequency divider 50 and a driving circuit 51 to deliver (feed) the original paper 12.

The receiving operation is described in the following.

When the power switch is switched to "ON", the facsimile equipment in the example according to the invention takes on the condition of reception waiting, which is maintained as long as no transmission operation is performed. The receiving operation is initiated by receiving a synchronization signal from an input terminal 22, by detecting it at the signal selector 60 and by controlling the flip-flop 66 through the OR-gate 63 causing the AND-gate 37 to open. After that, the pulse motors 2 and 32 are driven in exactly the same way as for the transmission operation. When no synchronization signal is received for more than a predetermined period, the signal selectors 60, 61 and synchronization signal detector 71 are activated, and the receiving operation is completed. If the synchronization signal is not properly transmitted due to noise or momentary interruption in the transmission line, the equipment returns to the reception-waiting condition (a condition of waiting for the next reception) while the carrier 1 stops at a predetermined position.

Since the AND-gate 59 opens with the output from the output terminal Q of the flip-flop 46, the synchronization signal received at the end of every one reciprocation of the carrier 1 is detected by a synchronization signal detector 71 to reset the counter 41.

And then, the carrier 1 returns to the initial position.

In this way, phase synchronization with the transmission station, in other words, start-stop phase synchronization every one reciprocating scanning, is realized. Since AND-gate 57 opens when the clock pulse from the clock pulse generator 42 is (n), the picture signal received directly after the synchronization signal is applied, only during this period, to the write head 24 through the input terminal 22, the AND-gate 57 and an amplifier 58.

FIG. 4 shows a time chart for the above mentioned operation of the example according to the present invention. From its stationary position, for instance, at the left end, the carrier 1 starts, is accelerated, reaches a constant velocity, is decelerated down to stopping as it approaches the right end, then again accelerated leftwards, reaches a constant velocity and is decelerated down to stopping as it approaches the left end. One reciprocation comprising a series of these successive action corresponds to one period (two main scannings) and for every series of these actions comprising one period a synchronization signal is sent and received. If an original paper is inserted at the transmission station, that is, a synchronization signal is sent at the starting point of the carrier; this synchronization signal is received at the receiving station so that the receiving carrier starts and reciprocates in perfect synchronization with the transmitting carrier, and once the transmitting carrier returns to its original position. A synchronization pulse for both the sending and receiving operations is sent out once again in order to maintain the synchronization between the transmitting and receiving stations. Acceleration and deceleration of the carrier are controlled by the counter 41 and the clock pulse generator 42, the constant-velocity section of the carrier's travel is determined by counting the number of clock pulse by the counter 44 (CO2) and this number corresponds to the travelling length of the carrier in relation to one step of the pulse motor 2. In the example according to the present invention, one scanning is prescribed for both sending and receiving by counting the clock pulses and if a slight defference in period appears between the clock pulses of the transmission and reception stations, the difference is detected by the synchronization signal detector 71 shown in FIG. 3 which controls the counter 41 which maintains the phase synchronization between the receiving station and the transmission station.

As described above in detail, the system according to the present invention has the advantage that synchronization error never occurs because the carriers are synchronized at the beginning of every one reciprocation; the circuits are simple because a counter circuit is used to control the scanning at the sending and the receiving sides and the oscillator does not have to be of any high performance or precision type so that the system can be advantageously utilized at low cost. In addtion, in this system there is no possibility that the transmitting and receiving carriers can travel in opposite directions, a problem which does occur in conventional systems.

Although in this example the system according to the present invention is described in relation to a facsimile system, it can also be applied to devices and equipments for reciprocation plane scanning other than facsimile equipment.

What is claimed is:

1. A facsimile scanning system for use with plane original paper and plane printing paper comprising a carrier movable linearly with respect to the original and printing paper in a main scan, a read-head and a write head mounted on said carrier for scanning the plane original paper and the plane printing paper, synchronization signal generator means for generating a synchronization signal, the movement of the carrier in a receiving station being initiated by the synchronization signal sent from a transmission station on a start-stop synchronization basis, wherein said synchronization signal generating means generates a synchronizating signal for each scan, in both directions, of the carrier at the transmission station.

2. A facsimile scanning system as set forth in claim 1 including a pulse motor for moving the carrier at said receiving station and a counter means for controlling said pulse motor, wherein said counter means receives said synchronization signal and is reset to zero thereby, said counter means initiating operation of said pulse motor and thereby the movement of said carrier when said counter means is reset to zero.

* * * * *